United States Patent
Chen et al.

(10) Patent No.: US 8,691,174 B2
(45) Date of Patent: Apr. 8, 2014

(54) NITRATE SALT-BASED PROCESS FOR MANUFACTURE OF GRAPHITE OXIDE

(75) Inventors: Shu Tao Chen, Shanghai (CN); Michael S. Paquette, Midland, MI (US); Mary A. Leugers, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 258 days.

(21) Appl. No.: 13/145,572

(22) PCT Filed: Jan. 19, 2010

(86) PCT No.: PCT/US2010/021366
§ 371 (c)(1),
(2), (4) Date: Jul. 21, 2011

(87) PCT Pub. No.: WO2010/085443
PCT Pub. Date: Jul. 29, 2010

(65) Prior Publication Data
US 2011/0280787 A1    Nov. 17, 2011

Related U.S. Application Data

(60) Provisional application No. 61/147,328, filed on Jan. 26, 2009.

(51) Int. Cl.
*C01B 31/00* (2006.01)
*C01B 31/04* (2006.01)
(52) U.S. Cl.
USPC ........................ 423/415.1; 423/448
(58) Field of Classification Search
USPC ............................ 423/448, 415.1
See application file for complete search history.

(56) References Cited

U.S. PATENT DOCUMENTS

| 2,798,878 | A | | 7/1957 | Hummers | |
| 3,323,869 | A | * | 6/1967 | Olstowski | 423/448 |
| 3,404,061 | A | * | 10/1968 | Bochman et al. | 428/143 |
| 8,048,950 | B2 | | 11/2011 | Prud'homme et al. | |
| 8,246,856 | B2 | * | 8/2012 | Leugers et al. | 252/378 R |
| 2011/0014111 | A1 | * | 1/2011 | Leugers et al. | 423/415.1 |

FOREIGN PATENT DOCUMENTS

WO    WO 2009/018204    *    2/2009    .............. C01B 31/04

OTHER PUBLICATIONS

Hummers, et al., Preparation of Graphitic Oxide, 1958; 1339.*
Staudenmaier, Ber. Dtsch. Ges. 1898; 31: 1481.*
Periodic Table Atomic Properties of the Elements, NIST SP 966 (Sep. 2003).*
Brodie et al.; "On the Atomic Weight of Graphite"; 1859; 249-259.
Hummers et al.; "Preparation of Graphitic Oxide"; 1958; 1339.
McAllister et al.; "Single Sheet Functionalized Graphene by Oxidation and Thermal Expansion of Graphite"; Chemical Materials; 2007; 19; 4396-4404; American Chemical Society.
Horiuchi et al.; "Carbon Nonofilm with a New Structure and Property"; Japanese Journal of Applied Physics; 2003; 42; 1073; The Smithsonian/NASA Astrophysics Data System.
Staudenmaier; Ber. Dtsch. Ges. 1898; 31, 1481.
Mack et al.; "Graphite Nanoplatelet Reinforcement of Electrospun Polyacrylonitrile Nanofibers"; Advanced Materials; 2005, 17, 1.
Fuzellier et al.; "A New Variety of Graphite Nitrate"; Laboratory of Applied Mineral Chemistry; Materials Science and Engineering; 31; 1977; 91-94.

* cited by examiner

*Primary Examiner* — Daniel C McCracken

(57) ABSTRACT

The present invention relates to a nitrate salt-based process for preparing a graphite oxide. The invention nitrate salt-based process employs starting materials comprising a sulfuric acid, an inorganic nitrate salt, an amount of water, a first amount of chlorate salt, and a graphite.

20 Claims, No Drawings

NITRATE SALT-BASED PROCESS FOR MANUFACTURE OF GRAPHITE OXIDE

CROSS REFERENCE TO RELATED APPLICATIONS

This is a §371 application of PCT International Patent Application Number PCT/US2010/021366 filed Jan. 19, 2010, and claims priority from provisional application Ser. No. 61/147,328 filed Jan. 26, 2009, each of which is incorporated herein by reference in its entirety.

The present invention relates to a nitrate salt-based process for preparing a graphite oxide. The invention nitrate salt-based process employs starting materials comprising a sulfuric acid, an inorganic nitrate salt, an amount of water, a first amount of chlorate salt, and a graphite.

BACKGROUND OF THE INVENTION

Graphite oxide is a class of an intercalated layered material that is prepared by oxidizing a graphite with an oxidizing agent such as, for example, a chlorate salt or a permanganate salt. Graphite oxides are especially useful as intermediates in the preparation of exfoliated graphites, including graphene. One method of preparing an exfoliated graphite is rapidly heating a graphite oxide to high temperatures as exemplified later herein.

Exfoliated graphite, also known as expanded graphite, generally is an exfoliated or partially delaminated graphite having a Brunauer-Emmett-Teller (BET) surface area greater than BET surface area of graphite but less than the BET theoretical surface area of a single graphene sheet (i.e., less than 2630 square meters per gram ($m^2/g$)). Conventional exfoliated graphite typically has a BET surface area of between about 15 $m^2/g$ to about 150 $m^2/g$, depending on average particle size. Exfoliated graphite is useful for a variety of applications including, for example, in the formation of composites such as polymer composites and the higher the BET surface area of the exfoliated graphite, the more useful it is in such composites.

One disadvantage of long-known chlorate salt-based graphite oxidation reaction processes is nitric acid in reaction mixtures. A portion of the nitric acid evaporates during the reaction. The evaporated nitric acid then condenses in gas outlet lines. The process also generates hazardous chlorine dioxide ($ClO_2$) gas, which is believed to be associated with effective oxidation of the graphite to graphite oxide. But during the reaction, concentration of the $ClO_2$ gas often builds up from headspace of reaction vessels, and nitric acid condensate in gas outlet lines has previously inhibited adequate venting of the $ClO_2$ gas from the headspace, leading the concentration of the chlorine dioxide to more quickly increase to explosive concentrations (i.e., 10% or higher, for example, 50%) in headspace of the reaction vessel. Further, the evaporated nitric acid corrodes reaction vessel equipment such as, for example, a cell or window in the reaction vessel that allows monitoring of progress of the reaction in the reaction mixture, or concentration of $ClO_2$ gas in the headspace of reaction vessel, by spectroscopic means (e.g., ultraviolet (UV) spectroscopy). To minimize such hazards and the disadvantage of using nitric acid, temperature of the reaction mixture is typically kept at about 0 degrees Celsius (° C.) to 5° C., but this temperature reduces solubility and reactivity of the chlorate salt and can also increase concentration of the chlorine dioxide in the reaction vessel when the reaction mixtures are warmed or allowed to warm to a higher temperature (typically ambient, i.e., about 25° C.) after addition of the chlorate salt. There is a need in the art for a graphite oxidation process that eliminates use of nitric acid without reducing quality of graphite oxide produced thereby.

BRIEF SUMMARY OF THE INVENTION

In a first embodiment, the present invention provides a nitrate salt-based process for manufacturing graphite oxide. The nitrate salt-based process comprises steps of: (a) mixing in a reaction vessel a reaction mixture comprising the following starting materials: a sulfuric acid, an inorganic nitrate salt, an amount of water, a first amount of a chlorate salt, and graphite; (b) allowing the reaction mixture to react to form graphite oxide; and (c) separating the graphite oxide from the reaction mixture to give an isolated graphite oxide.

DETAILED DESCRIPTION OF THE INVENTION

As used herein, "a," "an," "the," "at least one," and "one or more" are used interchangeably. In any embodiment described herein, the open-ended (non-excluding) terms "comprising," "comprises," and the like (which are synonymous with "including," "having," and "characterized by") may be replaced by the respective partially closed (partially excluding) phrases "consisting essentially of," "consists essentially of," and the like or the respective closed (excluding) phrases "consisting of," "consists of," and the like. The term "or" used in a listing of members, unless stated otherwise, refers to the listed members individually as well as in any combination.

For purposes of U.S. patent practice and other patent practices allowing incorporation of subject matter by reference, and the entire contents—unless otherwise indicated—of each U.S. patent, U.S. patent application, U.S. patent application publication, Patent Cooperation Treaty (PCT) international patent application and WO publication equivalent thereof, referenced in the instant Detailed Description of the Invention are hereby incorporated by reference. When available, a U.S. patent or U.S. patent application publication family member thereof may be incorporated by reference instead of the PCT international patent application or WO publication equivalent. In an event where there is a conflict between what is written in the present specification and what is written in a patent, patent application, or patent application publication, or a portion thereof that is incorporated by reference, what is written in the present specification controls.

In the present application, headings (e.g., "Definitions") are used for convenience and are not meant, and should not be used, to limit scope of the present disclosure in any way.

In an event where there is a conflict between a unit value that is recited without parentheses, e.g., 2 inches, and a corresponding unit value that is parenthetically recited, e.g., (5 centimeters), the unit value recited without parentheses controls.

In the present application, any lower limit of a range, or any preferred lower limit of the range, may be combined with any upper limit of the range, or any preferred upper limit of the range, to define a preferred embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

DEFINITIONS

The term "aqueous" and "aqueous solution of" when referring to a chemical compound (e.g., sodium nitrate or sodium chlorate) are synonymous and mean a solution comprising the chemical compound dissolved in water.

The terms "Brunauer-Emmett-Teller surface area" and "BET surface area" are synonymous and is measured using a method in which 30% nitrogen in helium, at a $P/P_0$ ratio of 0.3, is adsorbed onto a test sample at liquid nitrogen temperature. In the method, use a Quantachrome Monosorb BET surface area analyzer (Quantachrome Instruments, Boynton Beach, Fla., USA) having a measurement position to make the measurements. Load a test sample (e.g., an exfoliated graphite such as highly exfoliated graphite and graphene) into a tared cuvette and degas the test sample for 10 minutes at 200° C. and atmospheric pressure. Place the cuvette in the measurement position of the analyzer and allow it to purge for 10 minutes. Allow nitrogen/helium gas to absorb at liquid nitrogen temperature and then desorb at room temperature to give desorption signals. Record signal readings in square meters ($m^2$). Remove sample from the analyzer and determine its final sample mass. Divide integrated desorption signal by the final sample mass to obtain the BET surface area in square meters per gram. Repeat with two additional test samples. Average the BET surface area of the 3 runs to determine the final BET surface area.

The term "chlorate salt" means an inorganic ionic substance comprising an anion $ClO_3^-$ and one or more inorganic cations, wherein the inorganic cations are selected such that the substance is, in aggregate, neutral.

The term "exfoliated" means partially delaminated, fully delaminated and, preferably, mixtures thereof, For example, a graphene may be prepared by fully delaminating a graphite and a highly exfoliated graphite having a number average stacking of from >1 to 10 layers may be prepared by partially delaminating a graphite.

The term "exfoliated graphite" means any carbon material derived by exfoliating a graphite oxide or a graphite intercalation compound. The term "highly exfoliated graphite" means a carbon material derived by exfoliating a graphite oxide and having a BET surface area of from 200 $m^2/g$ to 1500 $m^2/g$. In some embodiments the BET surface area is from 400 $m^2/g$ to 1500 $m^2/g$.

The term "graphite" means a solid particle consisting essentially of crystalline carbon with a characteristic crystal structure as determined by X-ray diffraction.

The terms "graphite oxide" and "intercalated graphite oxide" are synonymous and mean a carbon material derived by oxidizing a graphite and comprising carbon atoms and oxygen atoms, wherein most, if not all, of the oxygen atoms are covalently bonded to some of the carbon atoms. Preferably, graphite oxide consists essentially of the elements carbon and oxygen. Separating (e.g., by filtration or centrifugation) the carbon material from a reaction mixture containing it gives a form of the "isolated graphite oxide." Preferably, the separated carbon material is further treated by washing it with a solvent, preferably water (e.g., tap, deionized, or distilled water), and drying the washed carbon material to give a washed and dried form of the isolated graphite oxide. In some embodiments, the graphite oxide further consists essentially of relatively small amounts (e.g., less than 5 wt %) of other inorganic species, which are believed to result from incomplete purification of the graphite oxide.

The term "inorganic nitrate salt" means an ionic substance lacking carbon atoms and comprising an anion $NO_3^-$ and one or more inorganic cations, wherein the inorganic cations are selected such that the substance is, in aggregate, neutral.

The term "nitric acid" means fuming $HNO_3$, concentrated $HNO_3$, or a mixture thereof. The "concentrated nitric acid" means a concentrated nitric mixture that formally consists essentially of $HNO_3$ and water, wherein the $HNO_3$ is at least 65 wt %, but 86 wt % or less, of the concentrated nitric acid mixture based on total weight of the concentrated nitric acid mixture. A "fuming nitric acid" means a fuming nitric mixture that contains more than 86 wt % of $HNO_3$, water, and optionally nitrogen dioxide ($NO_2$), based on total weight of the fuming nitric mixture.

The term "nitrate salt-based process" means a method of manufacture wherein an inorganic nitrate salt replaces a nitric acid as a starting material. Any $HNO_3$ that could be theoretically produced in situ in the nitrate salt process is preferably less than 10 wt %, more preferably less than 5 wt %, and still more preferably less than 2 wt % of the reaction mixture, based on total weight of the reaction mixture.

Unless otherwise noted, the phrase "Periodic Table of the Elements" refers to the official periodic table, version dated Jun. 22, 2007, published by the International Union of Pure and Applied Chemistry (IUPAC). Also any references to a Group or Groups shall be to the Group or Groups reflected in this Periodic Table of the Elements.

The term "sulfuric acid" means fuming $H_2SO_4$, concentrated $H_2SO_4$, or a mixture thereof. A "concentrated sulfuric acid" means a concentrated sulfuric mixture that formally consists essentially of $H_2SO_4$ and water, wherein the $H_2SO_4$ is at least 90 wt % of the concentrated sulfuric mixture based on total weight of the concentrated sulfuric mixture. A "fuming sulfuric acid" means a fuming sulfuric mixture that formally consists essentially of sulfur trioxide ($SO_3$), $H_2SO_4$, and water, wherein preferably the $SO_3$ is up to 30 wt % of the fuming sulfuric mixture.

Chlorate Salt

Preferably, the chlorate salt is a salt of the formula $M(ClO_3)_x$, wherein M is a metal of any one of Groups 1 and 2 of the Periodic Table of the Elements, the metal being in a formal oxidation state of +1 or +2, and x is an integer of 1 or 2 and is selected such that $M(ClO_3)_x$ is, in aggregate, neutral. Preferably, the chlorate salt comprises potassium chlorate, lithium chlorate, calcium chlorate, magnesium chlorate, barium chlorate, or sodium chlorate, more preferably solid potassium chlorate, and still more preferably aqueous sodium chlorate. In some embodiments, the chlorate salt is in a form of a solid powder. In other embodiments, the chlorate salt comprises an aqueous solution of the chlorate salt. The water comprising the aqueous solution of the chlorate salt and at least some of the amount of water mentioned in the first embodiment may be the same or different.

When the chlorate salt comprises aqueous sodium chlorate, preferably the aqueous sodium chlorate is at a concentration of at least 0.1 moles of sodium chlorate per liter of aqueous sodium chlorate, i.e., 0.1 molar (M). Also preferably, concentration of sodium chlorate in the aqueous sodium chlorate is up to a saturated solution, i.e., the concentration at saturation of sodium chlorate in water. In other embodiments, the sodium chlorate concentration is 8 molar or less. In some embodiments, the saturated aqueous sodium chlorate further contains solid sodium chlorate. Solubility of sodium chlorate in water at 20° C. is 101 grams (g) sodium chlorate per 100 milliliters (mL) water. Weight percent is calculated by dividing weight of chlorate salt by (sum of weight of chlorate salt+weight of water). Thus at 20° C. and density of water of 1.00 g/mL, a saturated aqueous sodium chlorate solution will be 101 g/201 g or 50.3 weight percent.

Graphite Intercalation Compound

Examples of suitable graphite intercalation compounds are commercially available under the trade names GRAFGuard® 160-50N (from GRAFTech Inc., Advanced Energy Technologies Division, Parma, Ohio) and HP-50 (from HP Material Solutions, Northridge, Calif.).

Graphite

Preferably, graphite is in powder form or flake form or mixtures thereof. Examples of suitable starting graphites are commercially available under the trade names Asbury 3775 (Asbury Graphite Mills Inc.) and TIMREX® GA96/10 (Timcal Graphite and Carbon, Inc.).

Preferably, the graphite consists essentially of particles having sizes characterized as being −10 mesh number (or, simply, −10 mesh) or a higher mesh number (e.g., −100 mesh graphite), wherein the "−" designation before the mesh number indicates particles pass through a sieve having the mesh number. A −10 mesh graphite means graphite that can pass through a −10 mesh screen. More preferably, the graphite consists essentially of particles having sizes characterized as being about −100 mesh or a higher mesh number, still more preferably about −300 mesh or a higher mesh number. Even more preferred is about −325 mesh graphite (i.e., particles will be about 44 μm or smaller). Particle size and mesh number are inversely related. Although fine graphite is preferable, coarse graphite may also be used, but it is preferable to adjust the concentration of the sulfuric acid and inorganic nitrate salt so that an excess of nitronium ion does not result in the consumption of chlorate salts.

Inorganic Nitrate Salt

Preferably, the inorganic nitrate salt comprises ammonium nitrate (i.e., solid or aqueous $NH_4NO_3$) or a metal nitrate salt of the formula $M(NO_3)_y$, wherein M is a metal of any one of Groups 1, 2, and 3 of the Periodic Table of the Elements, the metal being in a formal oxidation state of +1, +2, or +3, respectively, and y is an integer of 1, 2, or 3 and is selected such that $M(NO_3)_y$ is, in aggregate, neutral. Preferably, the inorganic nitrate is aluminum nitrate, ammonium nitrate, sodium nitrate, potassium nitrate, lithium nitrate, calcium nitrate, magnesium nitrate, or barium nitrate. More preferably, the inorganic nitrate is ammonium nitrate or sodium nitrate. Still more preferably, the inorganic nitrate is ammonium nitrate.

The inorganic nitrate salt is in solid form, in a form of an aqueous solution, or a combination thereof. In some embodiments, the inorganic nitrate salt is in a solid form, which includes anhydrous solid forms and hydrate solid forms, including partial hydrate solid forms. Preferably, the solid form consists essentially of a powder, more preferably a finely-divided powder. A preferred solid inorganic nitrate salt is solid ammonium nitrate or, more preferably, solid sodium nitrate. Where the inorganic nitrate salt and chlorate salt are each in solid form, preferably, the amount of water is what would have otherwise been used to prepare the corresponding aqueous solution of the inorganic nitrate salt.

Preferably, the inorganic nitrate salt comprises an aqueous solution of the inorganic nitrate salt. The water comprising the aqueous solution of the inorganic nitrate salt and at least some of the amount of water mentioned in the first embodiment may be the same or different. In some embodiments, the aqueous inorganic nitrate salt further comprises at least one inorganic nitrate salt in a form of a solid powder dispersed therein. In other embodiments, the aqueous inorganic nitrate salt consists essentially of the aqueous ammonium nitrate or the aqueous $M(NO_3)_y$ solution. Preferably the aqueous inorganic nitrate salt comprises aqueous aluminum nitrated, aqueous sodium nitrate or, more preferably, aqueous ammonium nitrate.

Preferably the aqueous inorganic nitrate salt is at a concentration of at least 0.1 moles of inorganic nitrate salt per liter of aqueous inorganic nitrate salt, i.e., 0.1 molar (M). Also preferably, concentration of inorganic nitrate salt in the aqueous inorganic nitrate salt is up to a saturated solution, i.e., the concentration at saturation of the inorganic nitrate salt in water. In some embodiments, concentration of the aqueous ammonium nitrate is about 1 M or higher, more preferably about 2 M or higher, still more preferably about 4 M or higher, and even more preferably about 8 M or higher. In other embodiments, concentration of the aqueous ammonium nitrate is about 15 M or lower. In some embodiments, the concentration of the aqueous ammonium nitrate is 120 grams ammonium nitrate per liter of aqueous ammonium nitrate (g/L) or more when measured at 0° C. or higher, and more preferably 200 g/L or higher when measured at 20° C. or higher.

Sulfuric Acid

In some embodiments, the sulfuric acid used in the oxidation reaction of the present invention is the concentrated sulfuric acid. In other embodiments, the sulfuric acid is the fuming sulfuric acid. In still other embodiments, the sulfuric acid is the mixture of concentrated and fuming sulfuric acids. Preferably, the concentrated sulfuric acid formally contains from about 90 wt % to about 98 wt % $H_2SO_4$, more preferably from about 95 wt % to about 98 wt % $H_2SO_4$, based on total weight of the concentrated sulfuric mixture. Preferably, the fuming sulfuric acid formally contains from about 20 wt % to about 65 wt % of $SO_3$ based on total weight of the fuming sulfuric mixture.

Process of Oxidizing Graphite to Graphite Oxide

The starting materials comprising the reaction mixture (i.e., a sulfuric acid, a nitric acid, water, a graphite, and a chlorate salt) are commercially available from a variety of vendors. The present invention also contemplates using one or more starting materials that are not obtained from a commercial vendor.

In some embodiments, the present invention contemplates using less than a standard weight ratio of a chlorate salt to graphite, wherein a standard weight ratio of chlorate salt to graphite is 11 grams (0.090 mole) of $KClO_3$ per 1.0 gram of graphite, or the mole equivalent of $ClO_3^-$ if other chlorate salts are employed. In such embodiments, preferably, the weight ratio of potassium chlorate or solid sodium chlorate to graphite is greater than 2:1 but less than 8:1. More preferably the weight ratio is at least 3:1, and still more preferably at least 4:1, and is more preferably 7:1 or less, and still more preferably 6:1 or less. It is particularly preferred that the weight ratio of potassium chlorate or solid sodium chlorate to graphite be at least 4:1 and no more than 6:1.

In other embodiments, the sodium chlorate comprises aqueous sodium chlorate and the weight ratio of the sodium chlorate to the graphite is from 20:1 to 0.1:1.

In some embodiments, the present invention contemplates using different concentrations of the graphite in the reaction mixture. In such embodiments, concentration of graphite in the reaction mixture is preferably at least about 2 wt %, more preferably at least about 4 wt %, and preferably no more than about 15 wt %, more preferably no more than about 10 wt %, even more preferably no more than about 8 wt %, based on the total weight of the reaction mixture.

In some embodiments, the present invention contemplates using different concentrations of the sulfuric acid in the reaction mixture. In such embodiments, concentration of sulfuric acid in the reaction mixture can vary, but is preferably at least about 50 wt %, more preferably at least about 55 wt %, and preferably is no more than 70 wt %, more preferably no more than about 65 wt %, based on the total weight of the reaction mixture.

In some embodiments, the present invention contemplates running reactions at different temperatures of the reaction mixture. In such embodiments, the reaction is preferably run at a temperature of the reaction mixture of 0° C. or higher, more preferably 20° C. or higher, still more preferably 26° C. or higher, and even more preferably 31° C. or higher. Also preferably, temperature of the reaction mixture is maintained at about 55° C. or lower. When the chlorate salt is solid sodium chlorate, preferably temperature of the reaction mixture preferably is 40° C. or higher and 100° C. or lower, more preferably about 55° C. or lower.

There is no particular limitation on reaction time, i.e., how long the reaction should be allowed to run starting when addition of the chlorate salt begins. Preferably, the reaction is quenched within 30 hours of reaction time, more preferably within 24 hours of reaction time, and still more preferably within 6 hours of reaction time. In many cases, extensive oxidation has already taken place within the first 4 hours of the reaction time. Highly exfoliated graphite having BET surface areas of 400 $m^2/g$ to 800 $m^2/g$ can be obtained by exfoliating graphite oxide produced within about 4 hours of reaction time.

Preferably after a suitable reaction time under the circumstances has been realized, the reaction is quenched, for example, by adding the reaction mixture to an excess of deionized water, with stirring. The resulting graphite oxide product may then be isolated by, for example, filtration, centrifugation, or decantation, with filtration being preferred. The filtered graphite oxide product may be washed with additional deionized water, and then dried, for example, at between about 60° C. and 80° C. overnight.

The present invention contemplates forming the reaction mixture in a variety of ways. In some embodiments, the process of the first embodiment is a continuous process (i.e., uninterrupted input of starting materials producing a flowing reaction mixture) or, more preferably, a batch process (i.e., input of fixed quantities of starting materials producing a separate unique reaction mixture). The batch process includes laboratory and manufacturing scale processes.

Preferably, the batch process reaction mixture is formed by steps of: (i) premixing the sulfuric acid, inorganic nitrate salt, water, and a graphite together to give a first sulfuric acid/inorganic nitrate salt/water/graphite mixture; and (ii) adding the chlorate salt to the sulfuric acid/inorganic nitrate salt/water/graphite mixture to give the reaction mixture. More preferably, the reaction mixture is formed by steps of: (i) premixing the sulfuric acid, water, and inorganic nitrate salt together to give a sulfuric acid/inorganic nitrate salt/water mixture; (ii) adding a graphite to the sulfuric acid/inorganic nitrate salt/water mixture to give a second sulfuric acid/inorganic nitrate salt/water/graphite mixture; and (iii) adding a chlorate salt to the second sulfuric acid/inorganic nitrate salt/water/graphite mixture to give the reaction mixture.

In a typical batch process according to the present invention, the sulfuric acid and inorganic nitrate salt are preferably first mixed together before addition of the other starting materials. The amounts of sulfuric acid and inorganic nitrate salt are as discussed above. Following mixing of the sulfuric acid and inorganic nitrate salt, sufficient time is allowed for the formation of the nitronium ion, for instance from 3 minutes to 4 hours. Then, the graphite is added to the sulfuric acid/inorganic nitrate salt mixture, preferably with stirring until the graphite is essentially uniformly distributed to give a sulfuric acid/graphite mixture/inorganic nitrate salt mixture. This allows the formation of the graphite-nitronium intermediate. The chlorate salt is then added, either in portions or all at once, to the sulfuric acid/inorganic nitrate salt/graphite mixture, with addition in portions being preferred. Following addition of the chlorate salt, the resulting reaction mixture is allowed to stir until the desired amount of graphite oxide is formed.

Preferably, the chlorate salt is added slowly so that $ClO_2$ gas production/evolution can be controlled and the amount of chlorate salt can be substantially minimized under the circumstances. Also preferably, the reaction vessel containing the reaction mixture also contains a headspace having $ClO_2$ gas therein, and defines a purge gas inlet, and a purged gas outlet. The reaction mixture is in fluid communication with the headspace of the reaction vessel. Also, an adjustable-flow source of purge gas is in sequential fluid communication with the purge gas inlet, headspace, and purged gas outlet of the reaction vessel. Preferably, the process further comprises a step of purging with a purge gas having a flow rate at least some of the $ClO_2$ gas from the headspace and out of the reaction vessel via the purged gas outlet. More preferably, the process of the first embodiment further comprises, in addition to the purging step, steps of: monitoring in real-time concentration of the $ClO_2$ gas in the headspace of the reaction vessel and adjusting the flow rate of the purge gas so that the concentration of the $ClO_2$ gas in the headspace of the reaction vessel is less than 10%, still more preferably less than 3%, even more preferably to less than 1%. Preferred real-time monitoring of concentration of the $ClO_2$ gas in the headspace of the reaction vessel is by infrared (IR), ultraviolet, visible, or Raman spectroscopy, more preferably Raman spectroscopy, and still more preferably ultraviolet-visible spectroscopy. Preferred purge gases are air, nitrogen gas, and inert gases (e.g., argon gas and helium gas). The purging step facilitates mass transfer of at least some of the $ClO_2$ gas in the headspace out of the reaction vessel and, more preferably, to a $ClO_2$ gas scrubber. The $ClO_2$ gas scrubber contains an excess amount of a scrubbing agent reactive with $ClO_2$, wherein the scrubbing agent reactive with $ClO_2$ is, for example, sodium thiosulfate ($Na_2S_2O_3$). An example of a preferred $ClO_2$ gas scrubber is a commercial trickle bed scrubber such as a TRI-MER® packed bed tower scrubber (Tri-Mer Corporation, Owosso, Mich., USA). Preferably, a concentrated nitric acid is not used as a starting material in the present invention process and consequently the purge gas outlet does not contain a material amount (a quantity sufficient to reduce purge gas flow by 5% or more at a purge gas flow rate of 100 milliliters per minute (mL/min) of, and preferably contains essentially no, a nitric acid vapors, and thus mass transfer of the $ClO_2$ gas from the headspace out of the reaction vessel is not materially inhibited by a nitric acid condensate.

In some embodiments, mixing of sulfuric acid and an inorganic nitrate salt results in formation of nitronium ion ($NO_2^+$) or mixing of sulfuric acid, an inorganic nitrate salt, and graphite results in formation of a nitronium ion-graphite complex or both nitronium ion-graphite complex and nitronium ion ($NO_2^+$). Preferably, the presence of the starting materials, nitronium ion, or a nitronium ion-graphite complex is monitored in the reaction mixture during the reaction (i.e., in real-time), more preferably monitored by Raman spectroscopy.

Another embodiment of the present invention concerns the real-time monitoring, in the graphite oxide formation process, of at least one of the starting materials, nitronium ion, a nitronium ion-graphite complex, and graphite oxide product. Such monitoring is particularly desirable in large-scale commercial processes, where real-time adjustments to the reaction, such as adjusting quantities of the starting materials, rates of addition of chlorate salt, reaction conditions such as cooling rate or cooling bath temperature, or a combination of two or more thereof may be made to attempt to maximize formation of graphite oxide product having a desirable characteristic (e.g., a graphite oxide suitable for producing a highly exfoliated graphite having a particular BET surface area) and reduce the potential for hazardous or explosive conditions. In addition, the monitoring allows control, by adjusting chlorate salt addition rate, of the concentration of the nitronium ion which, as discussed above, forms with the graphite particle an intermediate nitronium ion-graphite complex. As noted, excess formation of nitronium ion is preferably limited, in order to avoid consumption of expensive chlorate salts.

Raman spectroscopy is a particularly well-suited technique for the real-time monitoring of the graphite oxide manufacture process. Using Raman spectroscopy, it is possible to monitor the starting materials, including the chlorate and the nitronium ion formed by the sulfuric acid/inorganic nitrate salt, as well as the observed nitronium ion-graphite intermediate complex. Alternatively, the formation of graphite oxide product can be monitored by ultraviolet-visible spectroscopy. Thus, the inorganic nitrate salt and sulfuric acid may be used in relative ratios thereof needed to provide optimal concentration of nitronium ion-graphite complex by monitoring reactions in real-time with Raman spectroscopy and adjusting relative amounts of the inorganic nitrate salt and sulfuric acid if needed.

Nitronium ion, formed by the mixing of sulfuric acid and inorganic nitrate salt, can be observed in Raman spectroscopy as a band at about 1396 reciprocal centimeters ($cm^{-1}$). Without wishing to be bound by any particular theory, it is believed that upon addition of the graphite to the sulfuric acid/inorganic nitrate salt mixture formed in a process of the present invention, the nitronium ion reacts with the graphite particles to form the nitronium ion-graphite complex. The nitronium ion-graphite complex is observed in Raman as a band at about 1629 $cm^{-1}$. Potassium chlorate can be observed as a band at about 940 $cm^{-1}$. Carbons with $sp^3$ hybridization, representing the graphite oxide, are observed as a band at about 1360 $cm^{-1}$.

In preferred embodiments of the present invention, the amounts of the starting materials are selected such that the concentration of excess nitronium ion in the reaction mixture is essentially minimized throughout the reaction. Thus in some embodiments, the first amount of the chlorate salt is added at a monitored rate so as to essentially minimize the concentration of excess nitronium ion in the reaction mixture as measured by Raman spectroscopy. The concentration of nitronium is essentially minimized through the monitoring of the reaction by the use of appropriate amounts of starting materials and timing of their additions as described above. By essentially minimizing the concentration of excess nitronium, it has been found that an isolated graphite oxide useful for producing an exfoliated graphite having a higher BET surface area can be obtained. Preferably, the first amount of the chlorate salt is selected such that no nitronium ion-graphite complex is detectable in the reaction mixture by Raman spectroscopy after addition of the first amount of the chlorate salt is complete. When nitronium ion-graphite complex is detectable in the reaction mixture by Raman spectroscopy after addition of the first amount of the chlorate salt is complete, then preferably one or more second amounts of chlorate salt are added until nitronium ion-graphite complex is no longer observed by Raman spectroscopy, wherein each second amount may be the same or different. Preferably, each second amount of the chlorate salt is less than the first amount of the chlorate salt.

Process of Exfoliating Graphite Oxide to Make an Exfoliated Graphite

In some embodiments, the process of the first embodiment further comprises a step of: subjecting the isolated graphite oxide to an exfoliation step to produce an exfoliated graphite, more preferably a highly exfoliated graphite. The highly exfoliated graphite is characterized as having a BET surface area of from 200 $m^2/g$ to about 1500 $m^2/g$. Preferably, the highly exfoliated graphite has a BET surface area of 500 $m^2/g$ or higher, more preferably more than 600 $m^2/g$, still more preferably 700 $m^2/g$ or higher, even more preferably 800 $m^2/g$ or higher. While higher BET surface areas are usually preferred, in some embodiments of the present invention, the highly exfoliated graphite has a BET surface area of 1400 $m^2/g$ or lower, in other embodiments, 1200 $m^2/g$ or lower, and in still other embodiments 1000 $m^2/g$ or lower.

In some embodiments, the invention process of the first embodiment employs a significantly lower number of moles (e.g., 50% or lower) of inorganic nitrate salt per gram of graphite than number of moles of nitric acid per gram of graphite employed by a reference process that uses nitric acid instead of the inorganic nitrate salt. When the invention process further comprises exfoliating an isolated graphite oxide thereof to make an invention highly exfoliated graphite having first BET surface area, the first BET surface area is within 10% of a second BET surface area of a highly exfoliated graphite prepared by exfoliating an isolated graphite oxide prepared by the reference process.

The present invention contemplates forming highly exfoliated graphite from the graphite oxide by any of a variety of processes, including solution processes, sonication, or thermal processes. Preferred is thermal exfoliation at a temperature of from about 250° C. to about 2000° C., more preferably at a temperature of from about 500° C. to about 1500° C., still more preferably at a temperature of about 1000° C. Thermal exfoliation is done under a substantially inert atmosphere, e.g., under an atmosphere consisting essentially of nitrogen, helium, argon, or a mixture thereof. In a typical procedure, details of which are described later, the graphite oxide prepared as described above is placed in a quartz boat or other container suitable for high temperature conditions, and then the graphite oxide in the container is placed into a heated furnace under inert atmosphere, preferably anhydrous nitrogen, at high temperature for a short time, such as at about 1000° C. for 30 seconds. The container and resulting highly exfoliated graphite product are then withdrawn from the furnace and allowed to cool. Prior to use, the highly exfoliated graphite (typically fluffy black) may be homogenized in a blender or other homogenizer. Optionally, the highly exfoliated graphite may also be compacted lightly by applying moderate pressure to an amount thereof placed in a deformable space or container such as a vacuum bag or a metal die, respectively.

The exfoliated graphite, including highly exfoliated graphite, is useful as a filler in graphite polymer composites such as, for example, graphite ethylene vinyl acetate copolymer composites. The graphite polymer composites are useful materials for preparing, for example, molded articles such as interior automobile parts.

The following examples are illustrative of the present invention but are not intended to limit its scope.

Raman Spectroscopy

Raman spectra are collected using visible excitation at 532 nanometers (nm) and the spectrometer interfaced to a fiber optic probe. The tip of the probe is mounted on a portable probe stand and placed immediately outside a tube containing the starting materials. The probe is configured for 180 degree backscatter collection. The Raman spectrometer system is configured as follows:

Coherent 532 nm diode-pumped Nd/YAG laser—with doubling crystal;

Kaiser Holospec grating spectrograph;

532 nm Holoplex grating, filters, probe head;

4.5 mm focal length objective, Mark II probe, multimode fibers: 50 micrometer (μm) core excitation, 100 μm core collection.

While the above instrument configuration is used in the examples, there are many other configurations which can be used for this purpose and which provide analogous results.

Raman Band Assignments. Raman bands and their assignments are provided in Table 1. In Table 1, con means concentrated and cm$^{-1}$ means reciprocal centimeters.

TABLE 1

Assignments of vibrational bands

| Band (cm$^{-1}$) | Assignment |
|---|---|
| 435 | con sulfuric acid |
| 575 | con sulfuric acid |
| 910 | con sulfuric acid |
| 940 | chlorate |
| 1180 | con sulfuric acid |
| 1360 | sp$^3$ carbon |
| 1395 | nitronium |
| 1555-1625 | sp$^2$ carbon |
| 1630 | nitronium ion-graphite complex |
| ILB* | ILB |

*ILB means intentionally left blank

COMPARATIVE (NON-INVENTION) EXAMPLES

Comparative Example A1

One-Gram Graphite Scale Preparation of Graphite Oxide Using Concentrated Nitric Acid (0.15 mol HNO$_3$) and Solid KClO$_3$ This procedure is performed in a fume hood with good ventilation. The efficiency of the hood is checked before each reaction and filtration. This reaction utilizes a powerful oxidizer (KClO$_3$), concentrated sulfuric acid, and concentrated nitric acid and generates a toxic and explosive intermediate (ClO$_2$ gas).

Amounts of materials: 1 gram (g) of –325 mesh graphite powder or flake; 6.6 g of solid KClO$_3$; 17.9 milliliters (mL) of concentrated (98 wt %) H$_2$SO$_4$; and 9.5 mL of concentrated (70 wt %) nitric acid (0.15 mol HNO$_3$).

Reaction vessel (a cylindrical tube reactor) and scrubber set-up: Perform the reaction in a heavy-walled, 100 mL-volume glass cylindrical reaction vessel disposed in an ice-water bath placed on a magnetic stir plate. Cover the cylindrical reaction vessel with a loose-fitting polytetrafluoroethylene lid defining 3 apertures therethrough. Through one aperture dispose a thermocouple probe disposed inside a glass well filled partially (i.e., to 2.5 centimeters depth) with water, the thermocouple probe having a distal end submersible in the water in the glass well, the glass well having a distal end submersible in a reaction mixture to monitor temperature of the reaction mixture. Through another aperture dispose a inner-tubular lower portion of a motor-driven powder addition funnel, the inner-tubular lower portion being surrounded by a spaced-apart outer-tubular lower portion defining a purge gas inlet, the lower portion having a distal end disposed above any reaction mixture and the purge gas inlet being in fluid communication with a source of nitrogen gas. Through the remaining aperture dispose a glass tube that comprises a purge gas outlet having a distal end disposed above any reaction mixture and a proximal end that is in sequential fluid communication, via polytetrafluoroethylene tubing, with a ClO$_2$ gas scrubber, a drying tube, a gas flow meter, a vacuum manifold, and a water aspirator, wherein the ClO$_2$ gas scrubber, drying tube, gas flow meter, and vacuum manifold each have disposed therein a gas inlet and a gas outlet. Dispose an aqueous solution of Na$_2$S$_2$O$_3$, a buffering agent that is sodium dihydrogen phosphate (NaH$_2$PO$_4$), and an indicator that is sodium iodide (NaI) in the ClO$_2$ gas scrubber. Dispose a drying agent, solid calcium sulfate, in the drying tube. An optional aperture may be employed for purposes of drawing and returning a sample from the headspace for spectroscopic determination of ClO$_2$ concentration therein.

Premixing steps: Charge the cylindrical reaction vessel with a magnetic stir bar. Mix with stirring the concentrated sulfuric acid and concentrated nitric acid. Insert the distal end of the thermocouple probe/glass well into the sulfuric acid/nitric acid mixture. Cool the sulfuric acid/nitric acid mixture to a temperature of 2° C. Add the 1.0 g of –325 mesh graphite via a simple (i.e., not motorized) glass powder funnel to the sulfuric acid/nitric acid mixture, and stir to give a sulfuric acid/nitric acid/graphite mixture at a starting temperature of 2° C.

Chlorate salt addition step (time: from 20 minutes to 60 minutes): Sieve the KClO$_3$ through a 500 μm screen (ASTM –35 mesh) and add it to the motor-driven powder addition funnel. Start a nitrogen gas purge flow and adjust flow rate thereof to 150 mL of nitrogen gas per minute (mL/min) using vacuum to draw the reaction gases out of the reaction vessel and into the scrubber. Start the motor of the motor-driven powder addition funnel so as to add the KClO$_3$ slowly over 20 minutes while controlling temperature by adjusting the addition rate of the KClO$_3$ to maintain temperature of the resulting reaction mixture below 5° C. Observe formation of a yellow-colored gas in headspace of the cylindrical reaction vessel. Monitor temperature and be especially careful to not allow excessive amounts of the KClO$_3$ to fall too quickly into the resulting reaction mixture. If necessary, stop addition of the KClO$_3$ to maintain temperature below 5° C.

Allowing reaction to run: After all of the KClO$_3$ has been added, allow the reaction mixture to warm to a running temperature of 20° C. and continue stirring to give a total reaction time of 24 hours.

Quenching the reaction: Quench the reaction by adding the reaction mixture to a beaker containing 300 mL of deionized water, further rinsing the reaction vessel with deionized water and adding the rinses to the beaker. Filter (or centrifuge) the quenched mixture, and wash the resulting filtercake with additional 300 mL of deionized water to give brown filter cake. Dry in a laboratory oven (80° C.) until a constant weight is obtained to give a black-colored, isolated graphite oxide of Comparative Example A1.

Comparative Example A2

Preparation of Highly Exfoliated Graphite by Exfoliating the Isolated Graphite Oxide of Comparative Example A1

Grind the isolated graphite oxide of Comparative Example A1 in a grinder for 90 seconds to give a fine powder. Add a from 0.1 g to 0.3 g portion of the fine powder to a quartz boat equipped with a quartz loop on an end and covered with a tight-fitting, fine-mesh stainless steel screen. Conduct the following under a high purity anhydrous nitrogen gas atmosphere/purge. Preheat a tube furnace fitted with a quartz pyrolysis tube to a desired setpoint, typically 950° C. Preheat the quartz boat and a portion of the fine graphite oxide powder at entrance of the furnace tube for 1 minute to remove air and moisture from the fine powder, and then insert the quartz boat and the portion of preheated fine graphite oxide powder into the center of the quartz pyrolysis tube for heating for 30 seconds at 950° C. Draw the quartz boat back and allow the resulting material to cool for 1 minute at the entrance of the furnace tube, and then remove it completely from the tube and allow it to cool to room temperature to give highly exfoliated graphite of Comparative Example A2. Weigh the highly exfoliated graphite of Comparative Example A2 and determine its BET surface area as described herein. The results are reported later in Table 2.

Comparative Example B1

One-Gram Graphite Scale Preparation of Graphite Oxide Using Concentrated Nitric Acid (0.15 mol $HNO_3$) and Aqueous $NaClO_3$ Repeat the procedure of Comparative Example A1 except use a 5 M solution of $NaClO_3$ in water containing a total of 5.73 g of $NaClO_3$ instead of the solid $KClO_3$ and using a syringe pump for delivery of the aqueous $NaClO_3$ into the reactor tube instead of the motor-driven powder addition funnel to give an isolated graphite oxide of Comparative Example B1.

Comparative Example B2

Repeat the procedure of Comparative Example A2 except using the isolated graphite oxide of Comparative Example B1 instead of Comparative Example A1 to give highly exfoliated graphite of Comparative Example B2. The results are reported later in Table 2.

Specific examples of the processes of the present invention are described below.

EXAMPLES OF THE PRESENT INVENTION

Example 1a

One-Gram Graphite Scale Preparation of Graphite Oxide Using Aqueous $NH_4NO_3$ (0.075 mol $NO_3^-$) and Solid $KClO_3$ Repeat the procedure of Comparative Example A1 except use aqueous ammonium nitrate consisting of 6 g of $NH_4NO_3$ dissolved in 4 g deionized water instead of the concentrated nitric acid to give an isolated graphite oxide of Example 1a.

Example 1b

Preparation of Highly Exfoliated Graphite by Exfoliating the Isolated Graphite Oxide of Example 1a Repeat the procedure of Comparative Example A2 except using the isolated graphite oxide of Example 1a instead of Comparative Example A1 to give highly exfoliated graphite of Example 1b. The results are reported later in Table 2.

Example 2a

One-Gram Graphite Scale Preparation of Graphite Oxide Using Aqueous $NH_4NO_3$ (0.075 mol $NO_3^-$) and Aqueous $NaClO_3$ Repeat the procedure of Comparative Example A1 except use aqueous ammonium nitrate consisting of 6 g of $NH_4NO_3$ dissolved in 4 g deionized water instead of the concentrated nitric acid and use a 5 M solution of $NaClO_3$ in water containing a total of 5.73 g of $NaClO_3$ instead of the solid $KClO_3$ and a liquid addition funnel instead of the motor-driven powder addition funnel to give an isolated graphite oxide of Example 2a.

Example 2b

Preparation of Highly Exfoliated Graphite by Exfoliating the Isolated Graphite Oxide of Example 2a Repeat the procedure of Comparative Example A2 except use the isolated graphite oxide of Example 2a instead of Comparative Example A1 to give highly exfoliated graphite of Example 2b. The results are reported later in Table 2.

Example 3a

One-Gram Graphite Scale Preparation of Graphite Oxide Using Aqueous $NaNO_3$ (0.047 mol $NO_3^-$) and Solid $KClO_3$ Repeat the procedure of Comparative Example A1 except use aqueous $NaNO_3$ consisting of 4 g $NaNO_3$ dissolved in 4 g of deionized water instead of the concentrated nitric acid to give an isolated graphite oxide of Example 3a.

Example 3b

Preparation of Highly Exfoliated Graphite by Exfoliating the Isolated Graphite Oxide of Example 3a Repeat the procedure of Comparative Example A2 except using the isolated graphite oxide of Example 3a instead of Comparative Example A1 to give highly exfoliated graphite of Example 3b. The results are reported below in Table 2.

TABLE 2

| Isolated graphite oxide (Comparative) Example number | Number of moles of ($HNO_3$) or $NO_3^-$ salt used to make penultimate isolated graphite oxide | Highly Exfoliated graphite (Comparative) Example number | BET surface area (m$^2$/g) of the highly exfoliated graphite |
|---|---|---|---|
| (A1) | (0.15) | (A2) | 538 |
| (B1) | (0.15) | (B2) | 715 |
| 1a | 0.075 | 1b | 562 |
| 2a | 0.075 | 2b | 747 |
| 3a | 0.047 | 3b | 353 |

As shown by the Examples, inorganic nitrate salts are useful for preparing graphite oxide according to a process of the present invention. The graphite oxide is useful for preparing a highly exfoliated graphite according to a preferred method of the present invention. As shown in Table 2 by comparing results for Comparative Examples A1/A2 with those for Examples 1a/1b and by comparing results for Comparative Examples B1/B2 with those of Examples 2a/2b, the invention process for making isolated graphite oxides employs a significantly lower number of moles (e.g., 50% or lower) of inorganic nitrate salt per gram of graphite than number of moles of nitric acid per gram of graphite when making highly exfoliated graphites having comparable BET surface areas.

While the present invention has been described above according to its preferred embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A nitrate salt-based process for manufacturing graphite oxide, the process comprising steps of:
   (a) mixing in a reaction vessel a reaction mixture comprising the following starting materials: a sulfuric acid, an inorganic nitrate salt, an amount of water, a first amount of a chlorate salt, and a graphite;
   (b) allowing the reaction mixture to react to form graphite oxide; and
   (c) separating the graphite oxide from the reaction mixture to give an isolated graphite oxide
   wherein the reaction vessel containing the reaction mixture also contains a headspace having chlorine dioxide gas therein, a purge gas inlet, and a purged gas outlet, wherein the reaction mixture is in fluid communication with the headspace and the purge gas inlet and purged gas outlet, and the process further comprises a step of purging with a purge gas having a flow rate at least some of the chlorine dioxide gas from the headspace and out of the reaction vessel via the purge gas outlet.

2. The process as in claim 1, the process further comprising forming the reaction mixture by steps of:
   (i) premixing in the reaction vessel the following starting materials: the sulfuric acid, the inorganic nitrate salt, water, and graphite to give a first sulfuric acid/inorganic nitrate salt/water/graphite mixture; and
   (ii) adding the first amount of the chlorate salt to the first sulfuric acid/inorganic nitrate salt/graphite mixture to give the reaction mixture.

3. The process as in claim 1, the process further comprising forming the reaction mixture by steps of:
   (i) premixing in the reaction vessel the following starting materials: the sulfuric acid, water and inorganic nitrate salt to give a sulfuric acid/inorganic nitrate salt/water mixture;
   (ii) adding the graphite to the sulfuric acid/inorganic nitrate salt/water mixture to give a second sulfuric acid/inorganic nitrate salt/water/graphite mixture; and
   (iii) adding the first amount of the chlorate salt to the second sulfuric acid/inorganic nitrate salt/graphite mixture to give the reaction mixture.

4. The process as in claim 1, wherein the inorganic nitrate salt comprises ammonium nitrate or a metal nitrate salt of the formula $M(NO_3)_y$, wherein M is a metal of any one of Groups 1, 2, and 3 of the Periodic Table of the Elements, the metal M being in a formal oxidation state of +1, +2, or +3, respectively, and y is an integer of 1, 2, or 3 and is selected such that $M(NO_3)_y$ is, in aggregate, neutral.

5. The process as in claim 4, wherein the inorganic nitrate salt comprises an aqueous inorganic nitrate salt.

6. The process as in claim 5, wherein the inorganic nitrate salt comprises aqueous aluminum nitrate, aqueous ammonium nitrate, or aqueous sodium nitrate.

7. The process as in claim 4, wherein the inorganic nitrate salt comprises solid inorganic nitrate salt.

8. The process as in claim 7, wherein the solid inorganic nitrate salt is solid ammonium nitrate, solid aluminum nitrate, solid potassium nitrate, solid lithium nitrate, solid calcium nitrate, solid magnesium nitrate, or solid sodium nitrate.

9. The process as in claim 1, wherein the chlorate salt comprises calcium chlorate, magnesium chlorate, barium chlorate, lithium chlorate, potassium chlorate, or sodium chlorate.

10. The process as in claim 9, wherein the chlorate salt comprises solid potassium chlorate.

11. The process as in claim 1, wherein the chlorate salt comprises aqueous sodium chlorate.

12. The process as in claim 1, wherein presence of the starting materials, nitronium ion, or a nitronium-graphite complex is monitored in the reaction mixture during reaction by Raman spectroscopy.

13. The process as in claim 12, wherein the first amount of the chlorate salt is added at a monitored rate so as to minimize the concentration of excess nitronium ion in the reaction as measured by Raman spectroscopy.

14. The process as in claim 13, wherein the first amount of the chlorate salt is selected such that no nitronium-graphite complex is detectable in the reaction mixture by Raman spectroscopy after addition of the first amount of the chlorate salt is complete.

15. The process as in claim 1, wherein temperature of the reaction mixture is 0 degrees Celsius or higher and 55 degrees Celsius or lower.

16. The process as in claim 1, wherein the graphite consists essentially of particles having sizes characterized as being −10 mesh number or a higher mesh number, wherein the "−" designation before the mesh number indicates particles pass through a sieve having the mesh number.

17. The process as in claim 1, the process further comprising a step of monitoring in real-time concentration of the chlorine dioxide gas in the headspace of the reaction vessel and adjusting the flow rate of the purge gas so that the concentration of the chlorine dioxide gas in the headspace of the reaction vessel is less than 10% during step (b).

18. The process as in claim 1, the process further comprising a step of subjecting the isolated graphite oxide to an exfoliation step to produce an exfoliated graphite.

19. The process as in claim 18, wherein the exfoliated graphite comprises a highly exfoliated graphite, which is characterized as having a Brunauer-Emmett-Teller surface area of from about 200 square meters per gram to about 1500 square meters per gram.

20. A nitrate salt-based process for manufacturing graphite oxide, the process comprising steps of:
   (a) mixing in a reaction vessel a reaction mixture comprising the following starting materials: a sulfuric acid, an inorganic nitrate salt, an amount of water, a first amount of a chlorate salt, and a graphite;
   (b) allowing the reaction mixture to react to form graphite oxide; and
   (c) separating the graphite oxide from the reaction mixture to give an isolated graphite oxide wherein presence of the starting materials, nitronium ion, or a nitronium-graphite complex is monitored in the reaction mixture during reaction by Raman spectroscopy.

* * * * *